March 28, 1950 R. R. GUNDERSON 2,502,378
POWER UNIT FOR BRAKE SYSTEMS
Original Filed Jan. 6, 1945 2 Sheets-Sheet 2
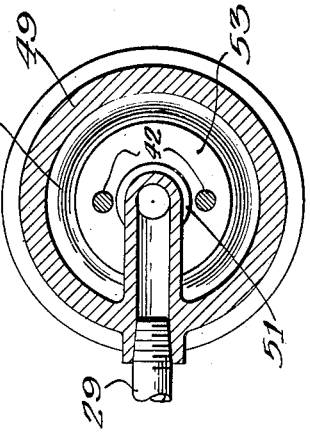
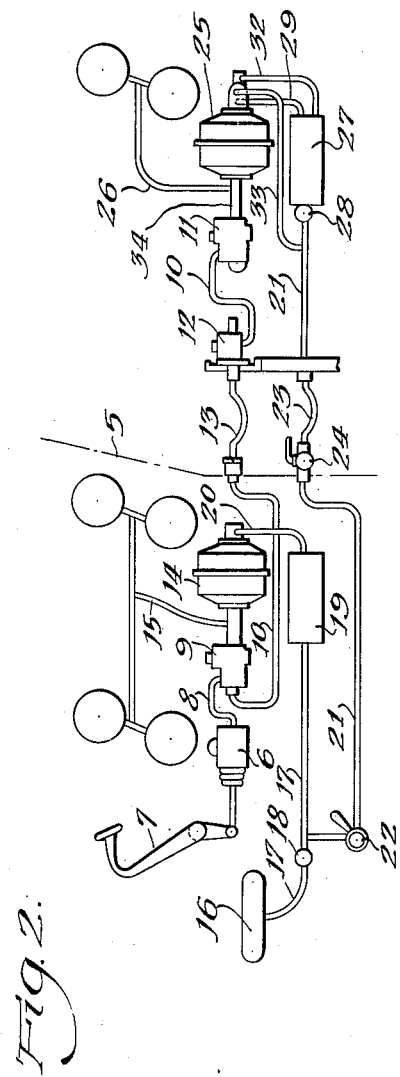
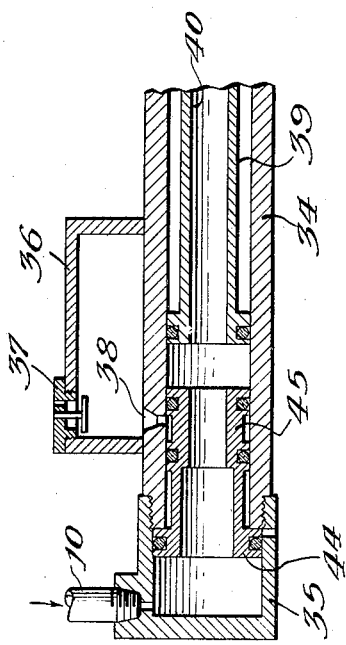
Inventor:
Ralph R. Gunderson
By Chritton, Schroeder,
Merriam & Hofgren
Attorneys Patented Mar. 28, 1950

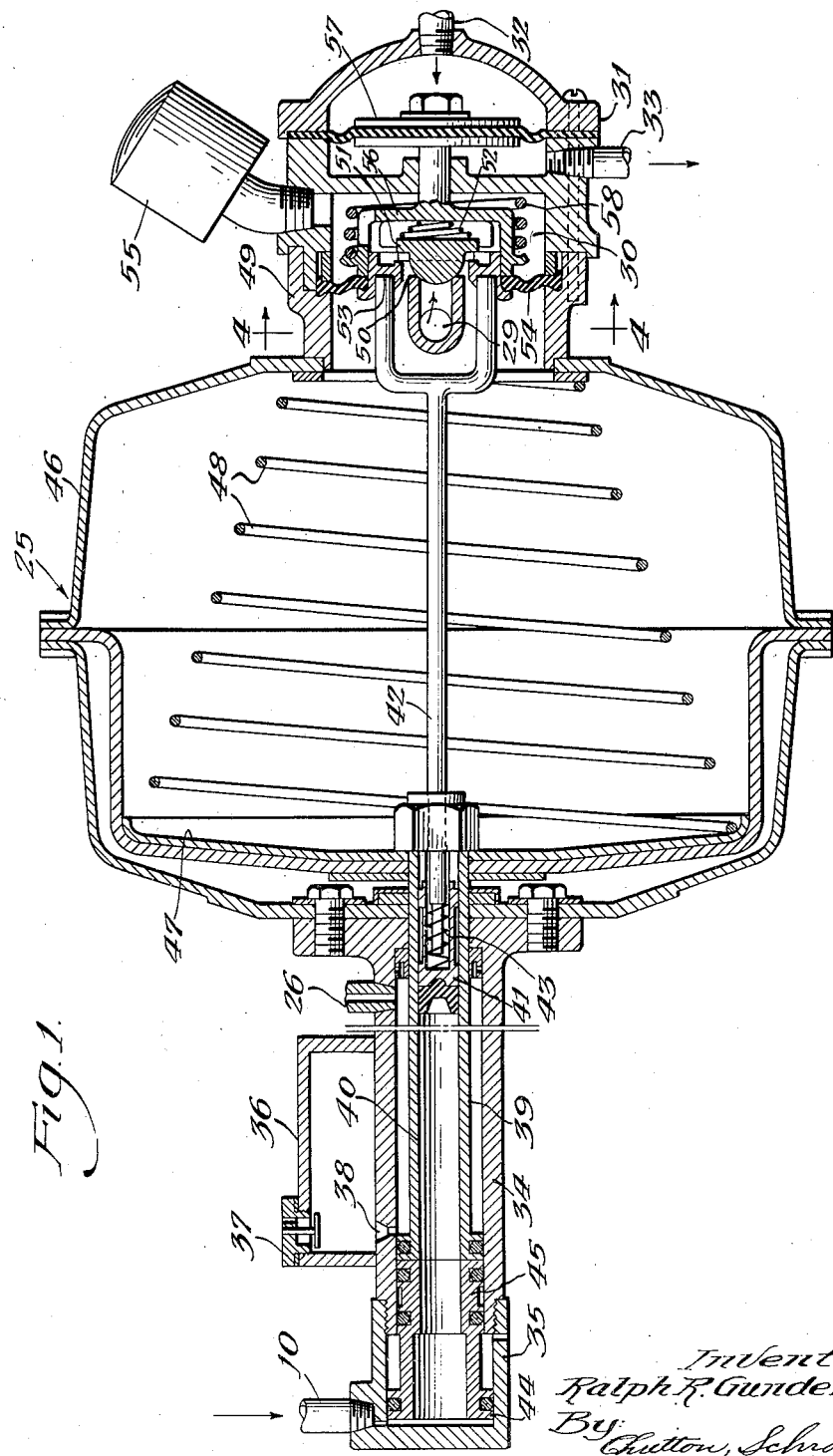

2,502,378

UNITED STATES PATENT OFFICE 2,502,378

POWER UNIT FOR BRAKE SYSTEMS

Ralph R. Gunderson, Chicago, Ill.

Original application January 6, 1945, Serial No. 571,583, now Patent No. 2,463,172, dated March 1, 1949. Divided and this application July 10, 1947, Serial No. 759,946

4 Claims. (Cl. 60—54.5)

This invention relates to hydraulic brake systems and more particularly to a system for operating the brakes of a motor truck and trailer.

The primary object of the invention is to provide an improved hydraulic brake system wherein only two hose connections are required between the tractor and the trailer, and in case of breakage of either of the hoses the brakes may be set on the trailer by pressure in the other hose.

Another object of the invention is to provide an improved power unit, including a suction motor booster, for the trailer brakes.

Another object of the invention is to provide an improved power unit, including a suction booster for the trailer brakes, wherein the valve to the booster will be controlled normally by the pressure from the pedal actuated master cylinder of the tractor, but in an emergency the same valve may be controlled by a hand valve on the tractor or automatically by a relay valve on the trailer.

Another object of the invention is to provide an improved operating cylinder for the trailer brakes wherein the pressure on the fluid coming from the master cylinder is increased.

Still another object of the invention is to provide a liquid reservoir for the operating cylinder on the trailer, which will enable air to escape from the cylinder when the brakes are released and cause liquid to fill the space left by the air. Of course, said reservoir will be automatically closed when pressure is applied to the operating cylinder.

The present application is a division of my application Serial No. 571,583, filed January 6, 1945, now Patent No. 2,463,172, for a Power brake system.

The invention is illustrated in a preferred embodiment, in the accompanying drawings, in which—

Figure 1 is a longitudinal sectional view of the operating cylinder, suction booster motor and relay valve for a trailer; Fig. 2, a diagrammatic view of a brake system for a tractor and trailer; Fig. 3, a fragmentary sectional view of the operating cylinder shown in Fig. 2, but in the position where pressure is applied to the brake cylinders; and Fig. 4, a vertical sectional view taken as indicated at line 4—4 of Fig. 1.

One form of the improved brake system is illustrated diagrammatically in Fig. 2, wherein a broken section line 5 separates the tractor side at the left from the trailer side at the right. A master cylinder 6, actuated by a brake pedal 7, is adapted to force brake liquid through a conduit 8 to the truck operating cylinder 9, and by means of a communicating conduit 10 to a trailer operating cylinder 11. The trailer has a socket connection 12 for a coupling hose 13, which is shown in my Patent No. 2,393,679, issued January 29, 1946.

A suction booster motor 14 on the tractor assists the operating cylinder 9 in forcing liquid through the conduit 15 to the wheel brake cylinders of the tractor. An intake manifold 16 on the tractor may be the source of suction for both the tractor and trailer. A conduit 17, provided with a check valve 18, leads to a tractor suction reserve tank 19, which is connected to the booster motor by suction line 20. The suction motor 14 is shown and described in my Patent No. 2,406,328, issued August 27, 1946. A suction line 21 is connected to the suction line 17, through a manually operable valve 22, which may shut off the line 21 from the suction line 17 or admit air into said line 21. The line 21 connects up with the trailer through a detachable hose connection 23 provided with a shut off cock 24.

The operating cylinder 11 on the trailer is provided with a suction booster motor 25, which is shown in detail in Figure 1. A conduit 26 from the operating cylinder leads to the brake cylinders on the wheels of the trailer. A suction reserve tank 27 is provided on the trailer, and is connected to the main suction line 21 through a check valve 28. A suction conduit 29 leads from the suction tank to the booster motor, and is normally controlled by a valve 30, but is provided with an emergency relay member 31, which is connected at one side by a conduit 32 to the suction tank, and is connected on the other side to a conduit 33 to the main suction line 21.

Referring now to the power unit on the trailer, shown in Fig. 1, a main operating cylinder 34 is mounted on the trailer and is provided on its low pressure side with an auxiliary cylinder 35, of slightly larger diameter, which communicates with the master cylinder of the tractor by means of the conduit 10. A liquid reservoir tank 36 is provided on the top side of the cylinder 34, and has the usual filler cap 37. A port 38 connects the reservoir to the rear portion of the cylinder 34.

A hollow piston 39 is provided in the cylinder 34, and forms a small cylinder 40 for a piston 41, which actuates a push rod 42 by a yielding compression spring 43. A hollow multiple head piston 44 has one head in the auxiliary cylinder 35, and a smaller diameter head in the cylinder 34. The smaller piston head 45 is adapted to bear against the end of the piston 39 when the brakes are released, as shown in Figure 1. When pressure is applied from the master cylinder to the conduit 10, the booster motor is energized by movement of the small piston 41 and will pull the piston 39 beyond the reservoir port 36 so as to cut it off from the conduit 26. The piston 45 is forced to follow the piston 39 to the position illustrated in Fig. 3, and holds the port 38 closed.

The lower front portion of the auxiliary cylinder 35 is vented to atmosphere, so that any pressure from the master cylinder will urge the piston assembly towards the piston 39. The piston head 44 is larger in cross-sectional area than the piston head 45, so that pressure from the master cylinder will cause the piston 45 to follow the piston 39 and close the port 38.

The suction booster motor and valve is similar to that shown in my said Patent No. 2,406,328, and has a metal casing 46 provided with a diaphragm 47, which is secured to the piston rod 39, and is urged forwardly by means of a conical spring 48. The booster motor valve is enclosed in a housing 49, and contains a seat 50 for a dome shaped valve member 51, which is adapted to close the suction line 29. The valve member 51 is urged to closed position by means of a conical spring 52.

The push rod 42 makes a sliding fit through the diaphragm 47, and has a bifurcated end which is connected to a ring member 53, carried by a flexible diaphragm 54 which has one side communicating with atmosphere through a filter vent 55, and the other side communicating with the interior of the motor casing 46. The ring member 53 is also connected to a spider-like member 56, which extends through the end of the housing 49, and is connected to the flexible diaphragm 57 of the relay member 31. A coil spring 58 urges the ring member 53 to the position shown in Figure 1, so that atmospheric pressure may enter through the member 55 and through the ring 53 to the inside of the motor casing. It will be understood that when the push rod 42, as viewed in Fig. 1, is moved to the right by pressure from the master cylinder through the conduit 10, it will cause the ring member 53 to engage the valve member 51 and shut off the communication with atmosphere. Further movement of the ring member 53 to the right will open communication between the conduit 29 and the interior of the motor housing, causing the suction pressure to draw the piston 39 to the right and force brake liquid through the conduit 26 to the wheels. This is the way the brakes are normally operated from the tractor by pressure on the foot pedal 7.

If movement of the pedal is stopped, atmospheric pressure on the diaphragm 54 will compress the spring 48 and shut off the suction line, and if the piston 39 is moving to the right under the influence of the booster, pressure will be reduced on the small piston 41 and will further facilitate the closing movement of the valve. As the operating cylinders of the tractor and of the trailer are each connected to the master cylinder, pedal pressure effects the simultaneous operation of both. This operation of a power cylinder is described in my said Patent No. 2,406,328.

In the event that the main suction line 21 should be broken, or air admitted through the valve 22, pressure would be increased on the left of the diaphragm 57, as viewed in Fig. 1, through the conduit 33, and as suction would be exerted on the opposite side of the diaphragm 57 by the conduit 32 to the suction tank, the ring 53 would be moved to the right and the suction motor operated to set the brakes.

Thus it will be understood that breakage of the main suction line 21 would set the brakes on the trailer automatically, or, should the conduit 10 to the master cylinder be broken, the operator may set the brakes on the trailer by means of the valve 22.

The foregoing detailed description is given for clearness of understanding only, and no unnecessary limitations should be understood therefrom, for some modifications will be obvious to those skilled in the art.

I claim:

1. A power unit in a hydraulic brake system comprising: an operating cylinder communicating at its rear end with a pedal actuated master cylinder and at its opposite end with a wheel cylinder; a reservoir on said cylinder having a port into the rear portion of the cylinder; a piston in said operating cylinder adapted to open said port when in its rearmost position; an auxiliary cylinder of slightly larger diameter axially disposed on the master cylinder end of the operating cylinder and communicating therewith, said auxiliary cylinder having its front side vented to atmosphere; a hollow multiple piston having one head in the auxiliary cylinder and another head in said operating cylinder adapted to engage the rear end of the first mentioned piston during a portion of its travel to close the reservoir port; a suction booster motor having a movable member connected to said first mentioned piston; a valve for connecting said booster motor with pressure or a suction line; and means for actuating said valve including a small cylinder communicating with the master cylinder, a piston in said small cylinder, a push rod connecting said last mentioned piston and valve, and a small flexible diaphragm connected to said push rod and having one side communicating with atmosphere and the opposite side with said suction motor.

2. Apparatus as specified in claim 1, in which the push rod makes a yielding connection with the piston in the small cylinder by means of a compression spring.

3. A power unit as specified in claim 1, in which the small cylinder serves as a hollow piston rod which connects the booster motor and the first mentioned piston.

4. Apparatus as specified in claim 1, in which a suction reserve tank is connected through a check valve to a main suction line, the booster motor valve is connected by a suction line to said tank, and a relay valve is provided for emergency operation of the booster motor valve, said relay valve having a diaphragm connected to said booster motor valve and having one side of said diaphragm communicating with the reserve tank and the other side with said main suction line.

RALPH R. GUNDERSON.

REFERENCES CITED

The following references are of record in the file of this patent:

UNITED STATES PATENTS

| Number | Name | Date |
|---|---|---|
| 2,352,357 | Almond | June 27, 1944 |
| 2,406,328 | Gunderson | Aug. 27, 1946 |